United States Patent [19]

Reber

[11] 4,007,805
[45] Feb. 15, 1977

[54] CAVITY PRODUCING UNDERWATER SOUND SOURCE

[75] Inventor: Rufus K. Reber, Washington, D.C.

[73] Assignee: The United States of America as represented by the Secretary of the Navy, Washington, D.C.

[22] Filed: Jan. 29, 1960

[21] Appl. No.: 5,565

[52] U.S. Cl. .................. 181/120; 116/27; 116/147; 340/8 R

[51] Int. Cl.² .................. G01V 1/04; G01V 1/38; H04B 13/00

[58] Field of Search .............. 116/27, 29, 18, 147, 116/18.3; 181/119, 120; 340/8, 12

[56] References Cited

UNITED STATES PATENTS

| 1,131,764 | 3/1915 | Williams | 116/27 |
| 1,475,385 | 11/1923 | Hecht et al. | 116/27 |

FOREIGN PATENTS OR APPLICATIONS

| 7,281 | 1914 | United Kingdom | 116/27 |

*Primary Examiner*—Harold Tudor
*Attorney, Agent, or Firm*—R. S. Sciascia; Q. E. Hodges

EXEMPLARY CLAIM

1. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution with at least one open port of non-constant cross-section connecting said inner and outer surfaces, said port being substantially larger in cross-sectional area at said inner surface than its cross-sectional area at said outer surface and, said rotor having appreciably greater thickness between said inner and outer surfaces than said stator; and drive means for rotating said rotor at a predetermined speed.

14 Claims, 6 Drawing Figures

INVENTOR
R. K. REBER

BY

ATTORNEYS

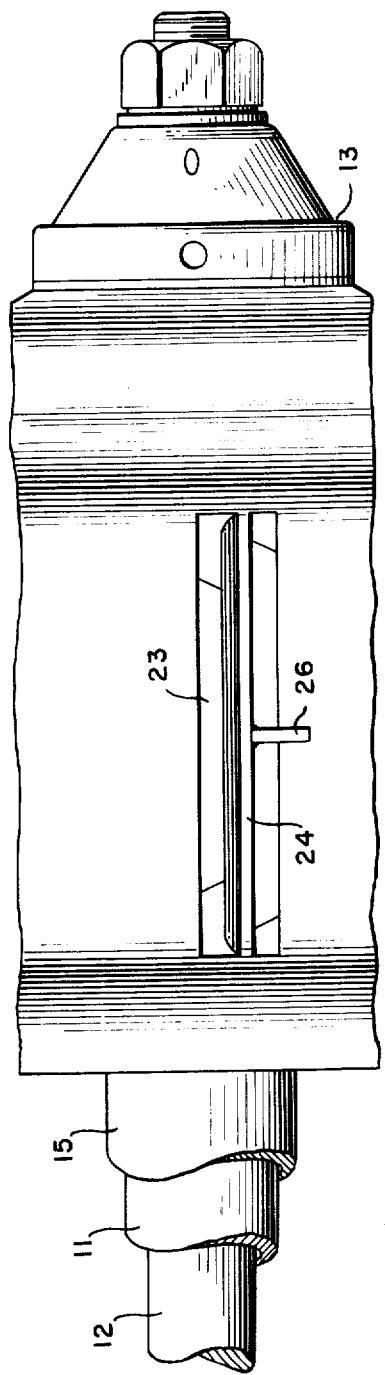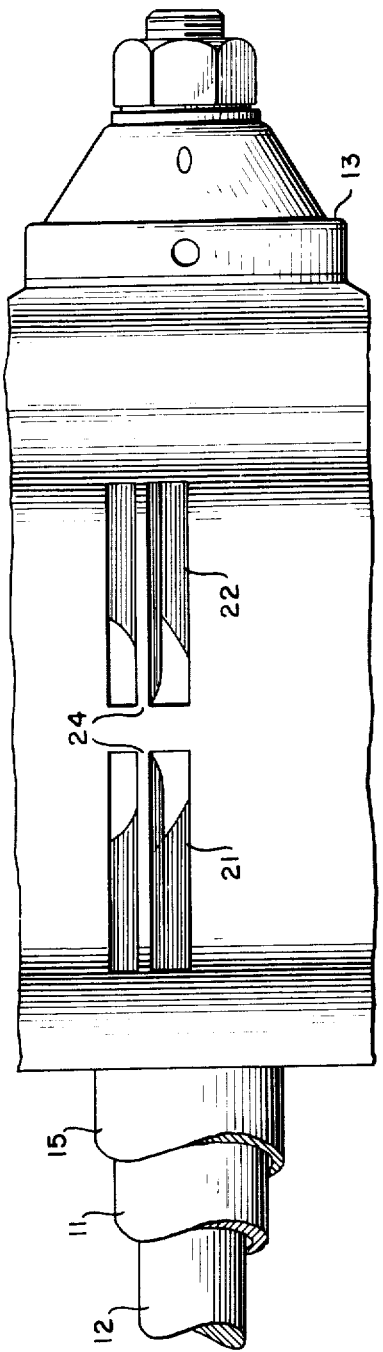

CAVITY PRODUCING UNDERWATER SOUND SOURCE

The invention described herein may be manufactured and used by or for the Government of the United States of America for governmental purposes without the payment of any royalties thereon or therefor.

The present invention relates to a cavity producing underwater sound source and more particularly to a cavity producing underwater sound source designed to produce large cavities at regularly timed intervals for the purpose of generating sound of medium and low frequencies.

Conventional underwater sound sources generally produce sound by means of moving or vibrating diaphragms which are mechanically or electrically activated. The output which can be obtained with a device of this type is limited by the cavitation which occurs at the diaphragm or vibrating surface when the amplitude of the displacements exceed a given limit. Generally at least two such devices of different sizes are required to produce the required bandwidth in mine sweeping applications.

In acoustical sources for use in minesweeping operations medium and low frequencies of large amplitude are required. The design of conventional vibratory sources to produce adequate outputs for minesweeping requires inconveniently large and heavy devices since a lower frequency in general requires a larger displacement. For very low frequencies the problem of size is a very serious one. It will be realized that the mechanical problems involved in displacing large mechanical diaphragms are also very serious.

Another disadvantage of the diaphragm type sound sources is the poor explosion resistance of these devices. An underwater explosion causes severe shock waves in the water and it is difficult to design a diaphragm type source or which is relatively resistant to nearby explosions. It will be realized by those skilled in the art that explosion resistance is a necessary characteristic in minesweeping gear.

Siren type underwater sound sources have also been tried and have been found to be practical in some applications. However, these deives suffer from severe disadvantages which have prohibited their use in minesweeping operations.

In the first place, siren type sources in order to produce the low frequencies needed for minesweeping would need to be extremely heavy and large and would present handling difficulties. Furthermore, large quantities of water must be supplied to the siren from an external source. For minesweeping this would entail providing a pump on the minesweeping vessel and connecting a hose, of perhpas 1000 feet or more in length to the siren, since structural damage to the sweeper due to detonation of mines must be avoided. In order to prevent excessive power losses in a hose this long, a hose of at least 3½ inches in diameter is required. This obviously would produce serious handling difficulties, particularly if the acoustical source is used in conjunction with magnetic or other gear.

The present invention comprises an external rotor of substantial thickness which contains one or more ports and is rotated by a submersible motor or impeller around a stator with one or more ports. One end of the stator is open to permit free passge of the surrounding water into the stator and out through the port openings. The stator may include air vents into the ports from an external air supply and a second rotor internally of the stator may also be provided.

This arrangement permits water to flow periodically into the rotor ports where it is accelerated by centrifugal force and ejected from the outer ends of the rotor ports at high velocity to form large external cavities which produce sound as they collapse.

Since the rotor is relatively heavy and also quite small, it offers greater explosion resistance than diaphragm acoustical sources. By proper design cavities will be produced which generate signals over a wide frequency range and with greater intensity than is obtainable with known minesweeping devices. The handling difficulties which would be inherent with siren type devices using a long water hose are also eliminated.

Thus, an object of the present invention is the provision of an underwater sound source capable of producing high intensity sound over a wide band.

Another object of this invention is to provide an underwater sound source capable of withstanding nearby explosions.

A further object is the provision of an underwater sound source which is of relatively small size and weight for ease in handling.

A still further object is to provide a broadband, high intensity acoustical source with handling qualities and explosive resistance suitable for minesweeping operations.

Other objects and many of the attendant advantages of this invention will be readily appreciated as the same becomes better understood by reference to the following detailed description when considered in connection with the accompanying drawings wherein:

FIG. 5 is a fragmentary top view of the embodiment shown in FIG. 3; and

FIG. 6 is a fragmentary bottom view of the embodiment shown in FIG. 3.

Figure 1:
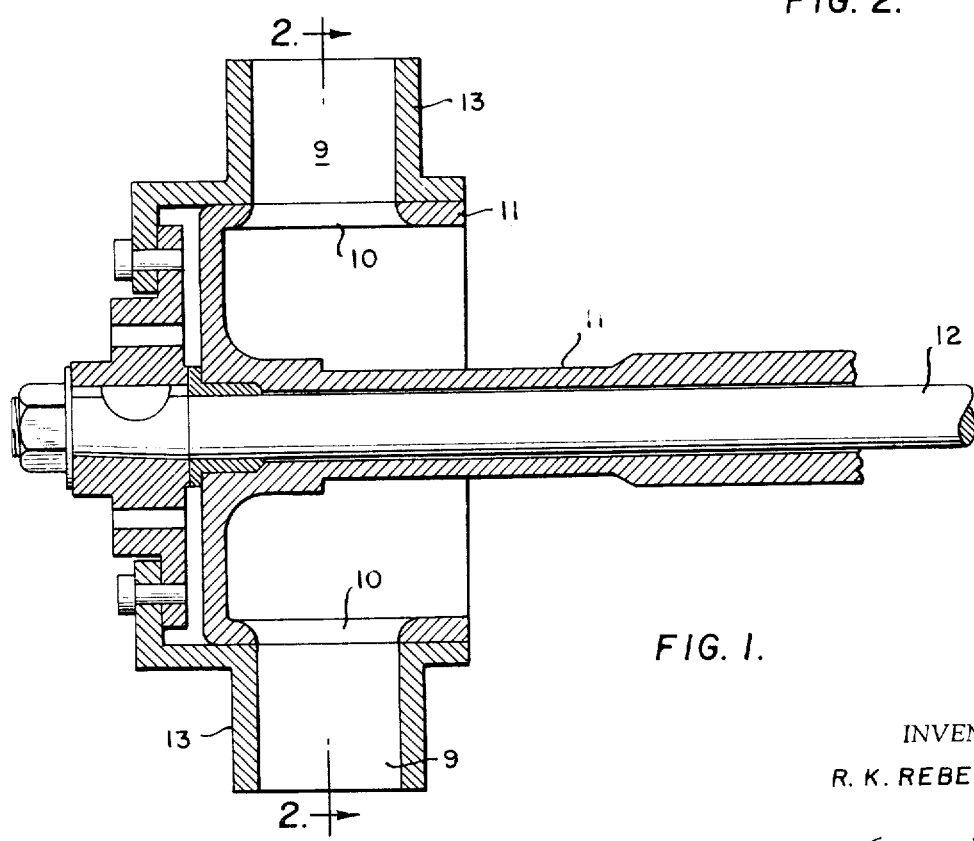
FIG. 1 is a side view, partly in section, of an embodiment of the invention.

Referring now to the drawings wherein like reference characters designate like or corresponding parts throughout the several views, there is shown in FIG. 1 a stator 11 which is designed to be fixed on a submersible support structure (not shown). Passing through stator 11 along the axis thereof is a shaft 12 which is driven at one end by a suitable power source such as an electric motor mounted on the submersible support structure. Attached to the outer end of shaft 12 is a rotor 13 adapted to be rotated around the external surface of stator 11.

Stator 11 is generally cylindrical in shape open at one end and having a pair of ports 10 through the cylindrical surface thereof.

Rotor 13 rotates around the outer surface of stator 11 and has a pair of elongated ports 9 leading from the inner surface thereof to the outer surface thereof. Rotor 13 is generally cylindrical in sahpe and has substantial thickness to allow the ports to be of substantial length as compared to the length of the stator ports.

Figure 2:
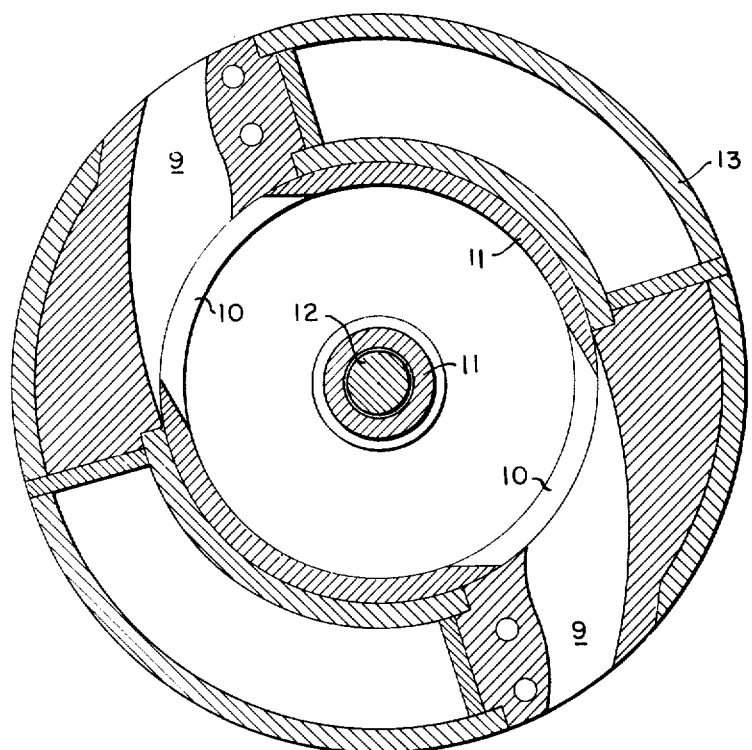
FIG. 2 is a section taken on line 2—2 of FIG. 1 looking in the direction of the arrows.

The rotor may have hollow spaces as seen in FIG. 2 to minimize its weight or alternatively it may be cast in a solid piece.

In use as an acoustical source for minesweeping operations, the unit described together with its power source is towed behind a minesweeping vessel at a predetermined depth by means of a cable or the like, Electric power may be supplied to the power source from the vessel.

The submerged power source driven rotor 13 by means of shaft 12 at a predetermined speed in accordance with the desired output. The speed may be held constant or varied as desired.

As rotor 13 is rotated around stator 11, said ports 9 have substantial depth, centrifugal force causes water to flow out of the rotor ports and as the rotor ports pass the stator ports water enters the rotor from the inside of the stator. At slow speeds this flow is smooth with water entering the rotor port through the stator during that portion of the cycle when the stator port is open to the rotor port, and an equal amount of water being ejected from the outside of the rotor port into the surrounding water.

At high speeds, however the water entering the rotor is accelerated at high speed causing a reduction in pressure at the inner ends of the rotor ports when the ports are closed by the stator. When this pressure is reduced to below the vapor pressure of water a cavity is formed. As the rate of rotation increases still further both the size of the cavity and its duration increase until eventually the momentum of the water in the rotor port and of the water just outside the port when combined with centrifugal force ejects the water from the rotor port and from a region just outside the port. At sufficiently high speeds there is negligible back flow into the outer end of the rotor ports and water enters the ports almost entirely through the stator.

Externally of the rotor this out flowing of water forms a high speed jet which moves laterally at high speed. This action of water jets from the ports at this point is considered to be similar to that of transverse fins suddenly projecting beyond the rotor surface. As is well konwn in the art, any object striking water at high speed is surrounded by a cavity with only its forward extremity touching the water. The maximum cross-sectional area of the cavity at different levels is roughly proportional to the space rate at which the object loses energy as it crosses the level.

Thus a large portion of the energy of the water jets issuing from the outer rotor is converted into the potential energy of the cavities which produce high intensity sound. The fundamental frequency of the sound will be equal to the number of flow cycles per second and the intensity will be dependent on the cavity size or energy transferred to the cavity by the water jet.

It will be realized by those skilled in the art that to provide the low frequencies necessary for minesweeping operations at sufficient intensity to cause mines to be detonated a considerable distance away from the sound source, a large, low speed rotor would be necessary. The low speed would be required to produce the low frequency fundamental; the large size would be needed to maintain cavities within the rotor ports at low speeds.

FIGS. 3–6 show an embodiment of the invention which is designed to allow low frequency high intensity sound to be produced using a smaller, relatively high speed rotor.

Referring now to FIGS. 3–6 there is shown a stator 11 which is fixed on a submersible support structure as in the first embodiment and a shaft 12 passing through the stator and adatped to be driven at one end by a suitable power source mounted on the support structure.

Attached to the outer end of shaft 12 is a rotor 13 adapted to be rotated around the external surface of stator 11. Positioned inside stator 11 is an internal rotor 14 driven by means of a gear 16 mounted on hollow shaft 15. Gear 16 is driven through a suitable transmission system (not shown) by the aforementioned power source.

Outer rotor 13 is divided into three compartments 17, 18 and 19, each having a port 21, 22 and 23, respectively, opening to the outside circumference of the rotor. Ports 21 and 22 are placed, side by side opposite port 23 and the sum of the areas of ports 21 and 22 is preferably equal to the area of port 23. It will be seen from FIG. 3 that each of the compartments has two cross-sections each encompassing 180°; its smallest cross section at the inner extremity and its greatest cross section at the port. Ports 21, 22, and 23 are each divided by a vane 24, and vane 24 of port 23 is supported by a web 26 at the center thereof for greater structural strength.

Figure 3:
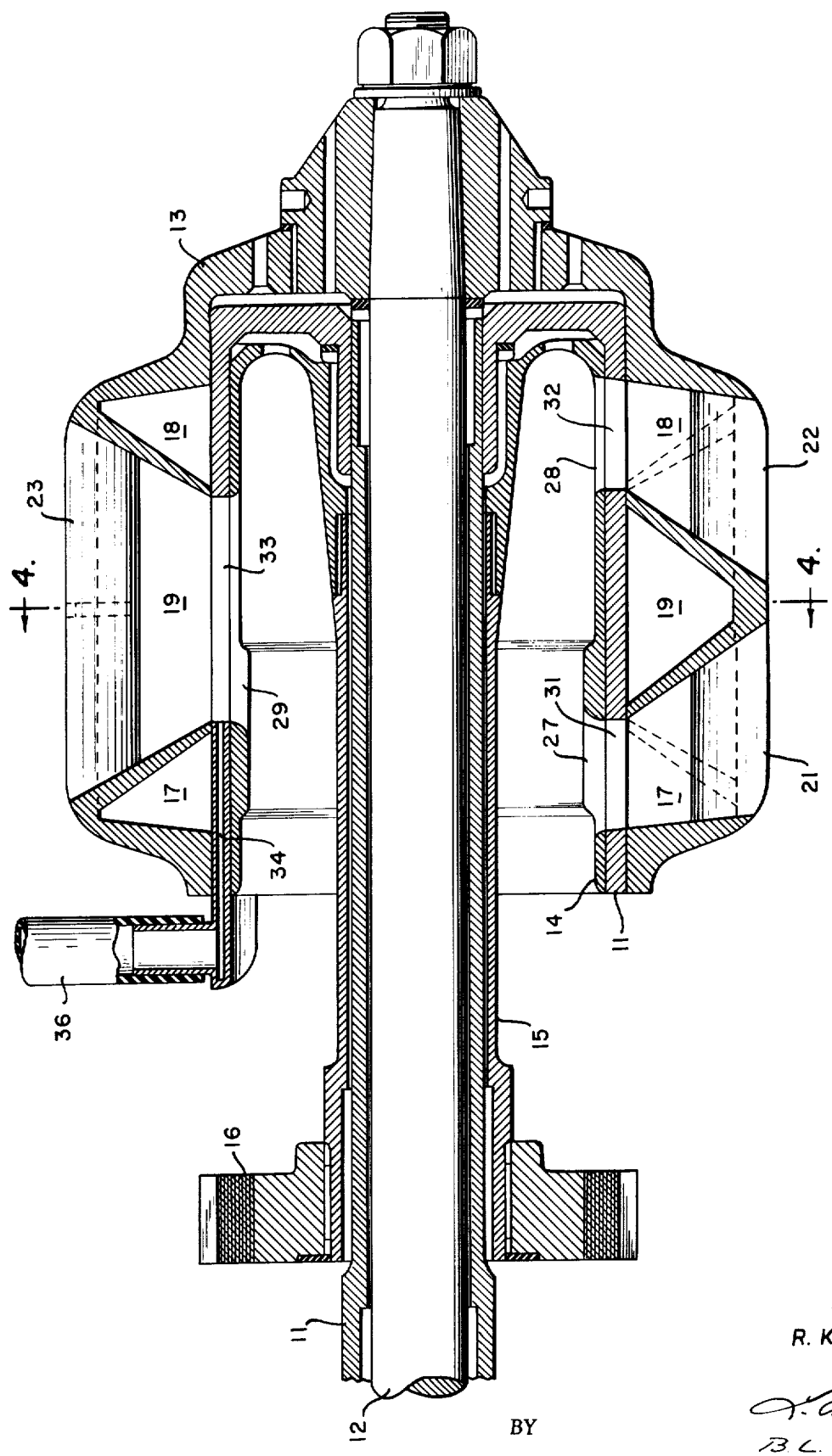
FIG. 3 is a side view, partly in section of another embodiment of the invention.
Figure 4:
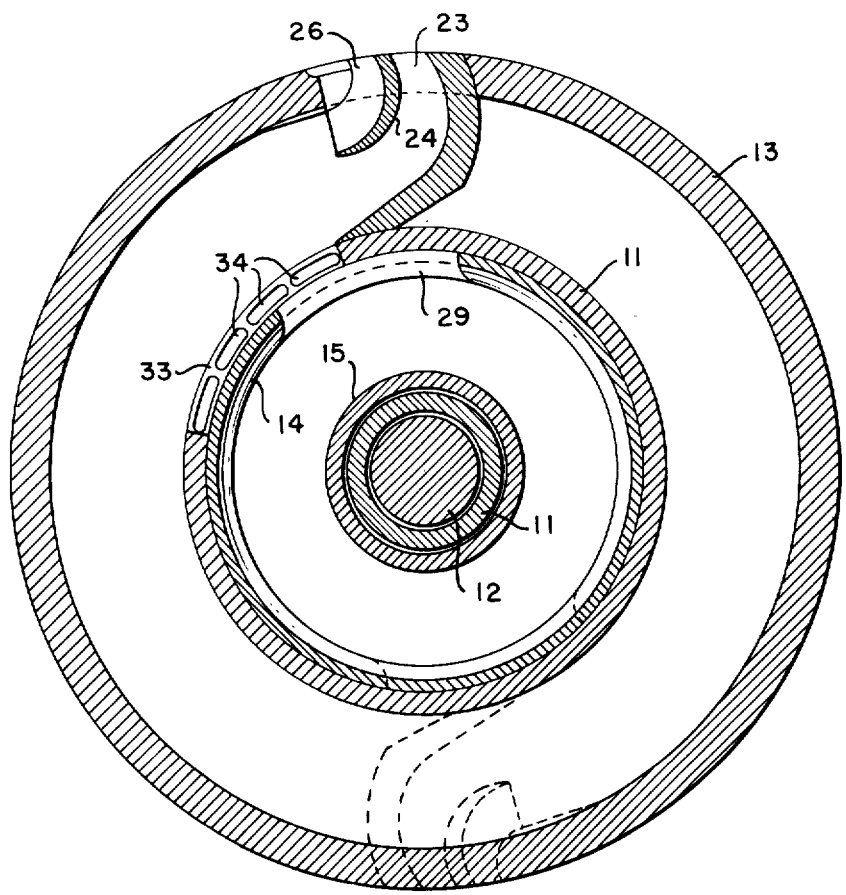
FIG. 4 is a section taken on line 4—4 of FIG. 3 looking in the direction of the arrows.

Inner rotor 14 as best seen in FIG. 3 is open at one end and has a plurality of ports 27, 28 and 29 opening to the stator 11.

Stator 11 also has a plurality of ports 31, 32 and 33 coinciding axially with ports 27, 28 and 29 of inner rotor 14 and ports 21, 22 and 23 of outer rotor 13. Included in stator 11 are a plurality of air vents 34 (FIG. 4) opening into ports 31, 32 and 33 connected to air supply hose 36 which is open to the atmosphere at the water surface.

For use as an acoustical source in minesweeping operations the unit described above together with its power source is towed behind a minesweeping vessel at a predetermined depth by means of a float and cables or the like. Electric power is supplied to the device from the vessel and the air hose is open to the atmosphere at the float which suspends the device at the proper depth.

The submerged power source drives outer rotor 13 by means of shaft 12 in one direction at predetermined speed and drives inner rotor 14 by means of gear 16 and shaft 15 at a different predetermined speed in accordance with the desired output.

The device of this embodiment has outer rotor ports which extend, in effect, a distance approximately equal to the circumference of the outer rotor. The inner ends of the ports are of small cross section for 180° and are enlarged for the remaining 180°. This provides a maximum port length with minimum volume of the outer rotor and allows formation of large cavities. The vanes in the rotor port openings minimize flow losses in the area where there is a large change of flow direction and direct the flow radially.

In order to reduce cavitation erosion due to the cavity formation, air is supplied to the stator ports through vents 33 by means of an air hose 36 which has an inlet above the water surface. Negative pressure in the rotor causes air at atmoshperic pressure to be sucked in thus increasing the size of the cavities and the output of the device allowing it to operate at lower speeds than would otherwise be required and it also reduces cavitation erosion of the rotor by reducing the pressure at the point of cavity collapse.

The outer rotor and stator operate substantially as has been described previously with relation to FIG. 1. However to produce a low frequency output, and yet maintain efficient rational speed of the outer rotor to generate cavities of the required size, an independent means is provided for controlling the timing of the inflow of water into the outer rotor ports through the stator ports. This is accomplished by the second rotor, rotated inside the stator. Inner rotor 14, rotating at a speed different from that of outer rotor 13, prevents water from entering the ports of the outer rotor from the stator part of the time when this would normally occur thus allowing the outer rotor to be relatively small while still allowing an output at very low frequencies. It will be realized that by reducing the inner rotor speed to a fraction of the speed of the outer rotor, the fundamental frequency produced will also be reduced to that fraction of its original frequency. Thus the inner rotor and stator act as valves for periodically opening the inner openings of the outer rotor ports.

Although the inner rotor has been shown as axially fixed it is obvious that it may also be displaced axially to vary the magnitude of the maximum size of the port openings during a cycle so as to obtain any desired modulation of the sound output in order to simulate the slow buildup of the sound of an approaching ship. Another method of modulating the sound output is by varying the speed of rotation which may be done by varying the frequency of the supply voltage to the power source.

It will also be realized that the number of ports and the port size and shape may be varied according to the principles herein disclosed and that although the device has been described for use in minesweeping operation, it is contemplated that the device may have different applications as well.

There has been described an embodiment of a broad band, high intensity underwater acoustical source which is capable of producing very low frequencies and is of relatively small size and weight when compared with known devices for this purpose.

Obviously many modifications and variations of the present invention are possible in the light of the above teachings. It is therefore to be understood that within the scope of the appended claims the invention may be practiced otherwise than as specifically described.

What is claimed is:

1. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution with at least one open port of non constant cross-section connecting said inner and outer surfaces, said port being substantially larger in cross-sectional area at said inner surface than its cross-sectional area at said outer surface and, said rotor having appreciably greater thickness between said inner and outer surfaces than said stator; and drive means for rotating said rotor at a predetermined speed.

2. A method of producing sound within a liquid medium comprising periodically entrapping portions of said liquid, adding air to said entrapped portions, accelerating said entrapped portions, and causing said accelerated entrapped portions to reenter said liquid medium at sufficient speed and in such manner as to cause large cavitation bubbles.

3. An underwater sound source comprising a hollow cylindrical walled stator having at least one substantially radial opening in the cylindrical wall thereof, one end of said stator being open to admit water, a hollow cylindrical external rotor encompassing the cylindrical surface of said stator, said external rotor having internal and external cylidrical surfaces having at least one passage from the internal surface thereof to the external surface thereof whereby water is allowed to pass through said stator opening into said rotor passage, said rotor passage having a cross sectional area at the internal rotor surface which is substantially larger than the cross sectional area at the external rotor surface, and means for rotating said rotor around said stator at sufficient speed to produce a cavity in the water in said rotor passages.

4. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution with at least one port connecting said inner and said outer surfaces, said port in said rotor having a cross-section at the inner surface thereof which is different from the cross-section of said port at the outer surface thereof, said rotor having appreciably greater thickness between said inner and outer surfaces than said stator; drive means for rotating said rotor at a predetermined speed, an internal rotor adatped to be rotated adjacent to the inner surface of said stator and having an opening internally thereof, an open port in said internal rotor connecting said opening and said inner surface of said stator, drive means for rotating said internal rotor at a predetermined speed different from the speed of the external rotor, a plurality of air vents in said stator opening into said open port of said stator and with air supply means connected to said air vent whereby air may be injected into the port in said stator.

5. An acoustical souce for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution, a plurality of open ports in said external rotor connecting said inner and outer surfaces, said ports each extending a distance approximately equal to the circumference of said external rotor, the inner ends of the ports being of small cross-section for 180 degrees the outer ends of said ports being of a substantially enlarged cross-section for the remaining 180 degrees; said rotor having appreciably greater thickness between the inner and outer surfaces than the thickness of said stator; and drive means for rotating said rotor at a predetermined speed.

6. An underwater sound source comprising a hollow cylindrical walled stator having at least one substantially radial opening in the cylindrical wall thereof, one end of said stator being open to admit water, a hollow cylindrical external rotor encompassing the cylindrical surface of said stator, said external rotor having internal and external cylindrical surfaces having at least one passage from the internal surface thereof to the external surface thereof whereby water is allowed to pass through said stator opening into said rotor passage, said rotor passage having a cross-sectional area at the internal rotor surface which is different from the cross-sectional area at the external rotor surface, means for rotating said rotor around said stator at sufficient speed to produce a cavity in the water in said rotor passages; and means for injecting air into said cavity from said radial opening in said stator.

7. An underwater sound source comprising a hollow cylindrical walled stator having at least one substantially radial opening in the cylindrical wall thereof, one end of said stator being open to admit water, a hollow cylindrical external rotor encompassing the cylindrical surface of said stator, said external rotor having internal and external cylindrical surfaces having at least one passage from the internal surface thereof to the external surface thereof whereby water is allowed to pass through said stator opening into said rotor passage, said rotor passage having a cross-sectional area at the internal rotor surface which is substantially larger than the cross-sectional area at the external rotor surface, means for rotating said rotor around said stator at sufficient speed to produce a cavity in the water in said rotor passages, and a cylindrical inner rotor adapted to be rotated adjacent the internal surface of said stator, said internal rotor having at least one passage through the cylindrical wall thereof and having one end open to admit water into the interior thereof whereby water flows into the interior of said inner rotor, through said port of said inner rotor, said opening in said stator, and through said passage in said external rotor.

8. An underwater sound source comprising a hollow cylindrical walled stator having at least one substantially radial opening in the cylindrical wall thereof, one end of said stator being open to admit water, a hollow cylindrical external rotor encompassing the cylindrical surface of said stator, said external rotor having internal and external cylindrical surfaces having at least one passage from the internal surface thereof to the external surface thereof whereby water is allowed to pass through said stator opening into said rotor passage, said rotor passage having a cross-sectional area at the internal rotor surface which is different from the cross-sectional area at the external rotor surface, means for rotating said rotor around said stator at sufficient speed to produce a cavity in the water in said rotor passages, a cylindrical inner rotor adapted to be rotated adjacent the internal surface of said stator, said internal rotor having at least one passage through the cylindrical wall thereof and having one end open to admit water into the interior thereof whereby water flows into the interior of said inner rotor, through said port of said inner rotor, said opening in said stator, and through said passage in said external rotor, and means for injecting air into said stator opening.

9. An acoustical source for minesweeping operations comprising a stator having outer and inner surfaces which are surfaces of revolution and an open port connecting said outer and inner surfaces, an external rotor adatped to be rotated around said outer surface of said stator and having outer and inner surfaces which are surfaces of revolution with at least one open port of non constant cross-section connecting said inner and outer surfaces, said port being substantially larger in cross-sectional area at said inner surface than its cross-sectional area at said outer surface and said rotor having appreciably greater thickness between said inner and outer surfaces than said stator, drive means for rotating said rotor at a predetermined speed, an internal rotor adapted to be rotated adjacent said inner surface of said stator and having an opening internally thereof and an open port connecting said opening and said inner surface of said stator, and drive means for rotating said internal rotor at a predetermined speed different from the speed of said external rotor.

10. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution with at least one open port of non constant cross-section connecting said inner and outer surfaces, said rotor having appreciably greater thickness between said inner and outer surfaces than said stator, drive means for rotating said rotor at a predetermined speed, an internal rotor adapted to be rotated adjacent said inner surface of said stator and having an opening internally thereof, and an open port connecting said opening and said inner surface of said stator, drive means for rotating said internal rotor at a predetermined speed different from the speed of said external rotor, and air supply means for injecting air into the port in said stator.

11. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution with at least one open port of non constant cross-section connecting said inner and outer surfaces, said rotor having appreciably greater thickness between said inner and outer surfaces than said stator, drive means for rotating said rotor at a predetermined speed, and air supply means for injecting air into the port of said stator.

12. A high intensity underwater sound source comprising rotary water acceleration means, means for periodically allowing water to enter said acceleration means, a port of non-constant cross-section in said rotary acceleration means to allow the accelerated water to be ejected from said acceleration means into a surrounding body of water, and air supply means for injecting air into the water entering said acceleration means.

13. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution, a plurality of open ports in said external rotor connecting said inner and outer surfaces, said ports each extending a distance approximately equal to the circumference of said external rotor, the inner ends of the ports being of small cross-section for 180° and the outer ends of said ports being of a substantially enlarged cross-section for the remaining 180°; said rotor having appreciably greater thickness between the inner and outer surfaces than the thickness of said stator; drive means for rotating said rotor at a predetermined speed, an internal rotor adapted to be rotated adjacent said inner surface of said stator and having an opening internally thereof and an open port connecting said opening and said inner surface of said stator, and drive means for rotating said internal rotor at a predetermined speed different from the speed of said external rotor.

14. An acoustical source for minesweeping operations comprising a stator having outer and inner surfaces which are surfaces of revolution and an open port connecting said outer and inner surfaces, an external rotor adapted to be rotated around said outer surface of said stator and having outer and inner surfaces which are surfaces of revolution, a plurality of open ports in said external rotor connecting said inner and outer surfaces, said ports each extending a distance approximately equal to the circumference of said external rotor, the inner ends of the ports being of small cross-section for one hundred eighty degrees and of an enlarged cross-section for the remaining one hundred eighty degrees, said rotor having appreciably greater thickness between the inner and outer surfaces than the thickness of said stator; drive means for rotating said rotor at a predetermined speed, an internal rotor adapted to be rotated adjacent said inner surface of said stator and having an opening internally thereof and an open port connecting said opening and said inner surface of said stator, drive means for rotating said internal rotor at a predetermined speed different from the speed of said external rotor, and air supply means for injecting air into the ports of said stator.

* * * * *